(12) United States Patent
Yamakado

(10) Patent No.: US 8,373,890 B2
(45) Date of Patent: Feb. 12, 2013

(54) PRINTING PROCESSING APPARATUS, METHOD, AND SYSTEM, AND COMPUTER READABLE RECORDING MEDIUM FOR PROCESSING AT VARIOUS RESOLUTIONS

(75) Inventor: Takeshi Yamakado, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1580 days.

(21) Appl. No.: 11/641,786

(22) Filed: Dec. 20, 2006

(65) Prior Publication Data
US 2007/0291285 A1    Dec. 20, 2007

(30) Foreign Application Priority Data
Jun. 20, 2006  (JP) .................................. 2006-170601

(51) Int. Cl.
*G06K 15/02*  (2006.01)
(52) U.S. Cl. ......... 358/1.2; 358/1.13; 358/2.1; 382/148; 382/261; 382/276; 382/299
(58) Field of Classification Search .................. 358/1.2, 358/1.13, 2.1; 382/148, 261, 276, 299
See application file for complete search history.

(56) References Cited

U.S. PATENT DOCUMENTS

| | | | | |
|---|---|---|---|---|
| 5,115,281 | A * | 5/1992 | Ohtsuka et al. | 399/16 |
| 5,208,605 | A * | 5/1993 | Drake | 347/15 |
| 6,493,110 | B1 * | 12/2002 | Roberts | 358/1.2 |
| 6,678,072 | B1 * | 1/2004 | Matsuoka et al. | 358/2.1 |

FOREIGN PATENT DOCUMENTS

| | | |
|---|---|---|
| JP | A-2004-259005 | 9/2004 |
| JP | A 2004-280385 | 10/2004 |
| JP | A-2006-21484 | 1/2006 |

OTHER PUBLICATIONS

Japanese Patent Office, Notification of Reasons for Rejection for Japanese Patent Application No. 2006-170601 (with English translation), dated Dec. 7, 2010, pp. 1-2.

* cited by examiner

*Primary Examiner* — Jacky X Zheng
(74) *Attorney, Agent, or Firm* — Oliff & Berridge, PLC

(57) ABSTRACT

A printing processing device that includes an analyzing unit that analyzes the components of print data. Based on the analysis results, a first raster processing unit performs raster processing at a first resolution for the print data of a portion of the components of the print data other than an optically read printing portion. Similarly, based on the analysis results, a second raster processing unit that performs raster processing at a second resolution higher than the first resolution, for the print data of the optically read printing portion of the components of the print data. Further, the printing processing device includes a resolution conversion unit that converts the print data that has been processed by the first raster processing unit into the second resolution and a synthesizing unit that synthesizes the print data that has been converted into the second resolution by the resolution conversion unit and the print data that has been processed by the second raster processing unit.

20 Claims, 4 Drawing Sheets

PRINTING PROCESSING APPARATUS, METHOD, AND SYSTEM, AND COMPUTER READABLE RECORDING MEDIUM FOR PROCESSING AT VARIOUS RESOLUTIONS

BACKGROUND

1. Technical Field

The present invention pertains to a printing processing apparatus, method, and system and a computer readable recording medium, and to a printing processing apparatus, method, and system and a computer readable recording medium utilizing low resolution data as a resource.

2. Related Art

In recent years, a charge collection service which is conducted by a cashier of a convenience store using a payment form with a barcode that is issued by an enterprise under a contract concluded with the convenience store has been being performed. For the charge collection service in the convenience store, a barcode, and the like, are printed in the payment form on the basis of customer information. However, conventionally, print data which allows the optically read printed portion to be printed finer than other portions has not been able to be obtained.

SUMMARY

According to an aspect of the present invention, a printing processing apparatus comprises analyzing means which analyzes the components of print data; first raster processing means which, on the basis of the analysis result of the analyzing means, performs raster processing at a first resolution for the print data of the portion of the components of the print data other than the optically read printing portion; second raster processing means which, on the basis of the analysis result of the analyzing means, performs raster processing at a second resolution higher than the first resolution for the print data of the optically read printing portion of the components of the print data; resolution conversion means which converts the print data which has been processed by the first raster processing means into the second resolution; and synthesizing means which synthesizes the print data which has been converted into the second resolution by the resolution conversion means and the print data which has been processed by the second raster processing means.

BRIEF DESCRIPTION OF THE DRAWINGS

Exemplary embodiments of the present invention will be described in detail based on the following figures, wherein.

DETAILED DESCRIPTION

Hereinbelow, embodiments of the present invention will be described in detail with reference to the drawings.

First Embodiment

Figure 1:
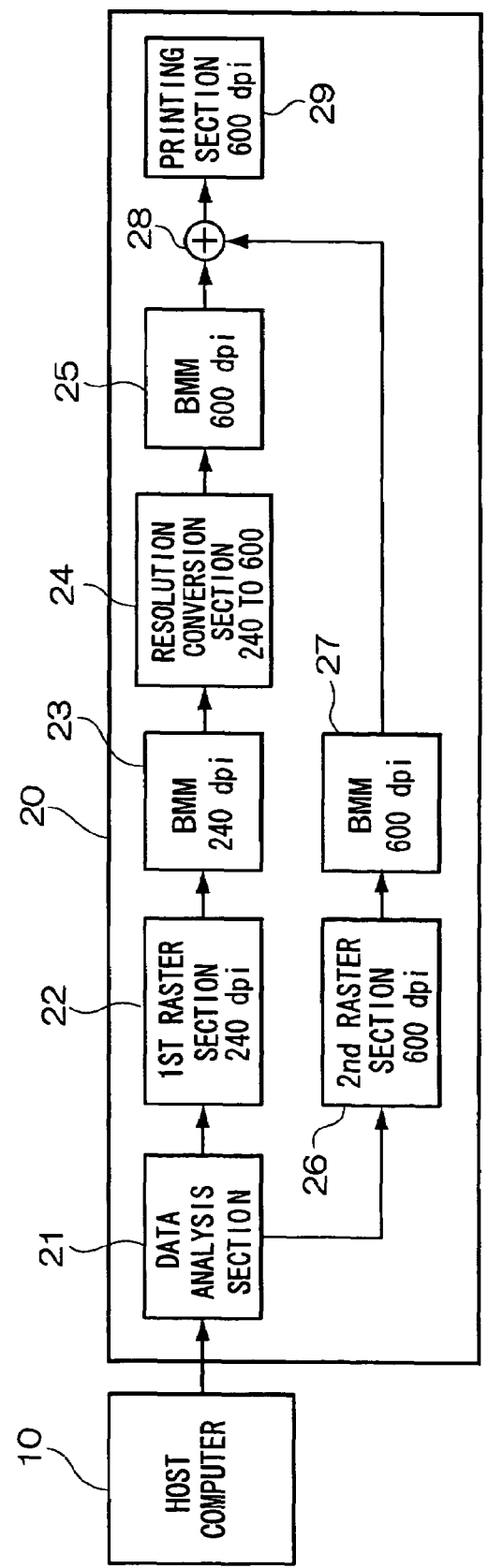
FIG. 1 is a block diagram illustrating the configuration of a printing system pertaining to a first embodiment of the present invention.

FIG. 1 is a block diagram illustrating the configuration of a printing system pertaining to a first embodiment of the present invention. The printing system comprises a host computer 10 which outputs print data, and a printing apparatus 20 which carries out printing on the basis of the print data from the host computer 10.

The printing apparatus 20 comprises a data analysis section 21 which analyzes the components of print data; a first raster section 22 which performs raster processing at 240 dpi; a bitmap memory (BMM) 23 which temporarily stores bitmap data; a resolution conversion section 24 which performs resolution conversion from 240 dpi to 600 dpi; and a bitmap memory (BMM) 25 which temporarily stores resolution converted data.

The printing apparatus 20 further comprises a second raster section 26 which performs raster processing at 600 dpi; a bitmap memory (BMM) 27 which temporarily stores bitmap data; a synthesizer 28 which synthesizes the bitmap data; and a printing section 29 which prints the synthesized bitmap data at 600 dpi.

In the printing system configured as above, the host computer 10 transmits print data of 240 dpi including components such as a character, a figure, an image, an overlay, a barcode, and an OCR font (a font which can be read with an optical reading apparatus), to the printing apparatus 20. In the present embodiment, the barcode and the OCR font correspond to the resolution of 240 dpi, but it is prescribed that they be subjected to raster processing at the resolution of 600 dpi. When the printing apparatus 20 receives the above-mentioned print data from the host computer 10, it implements the subsequent processing.

Figure 2:
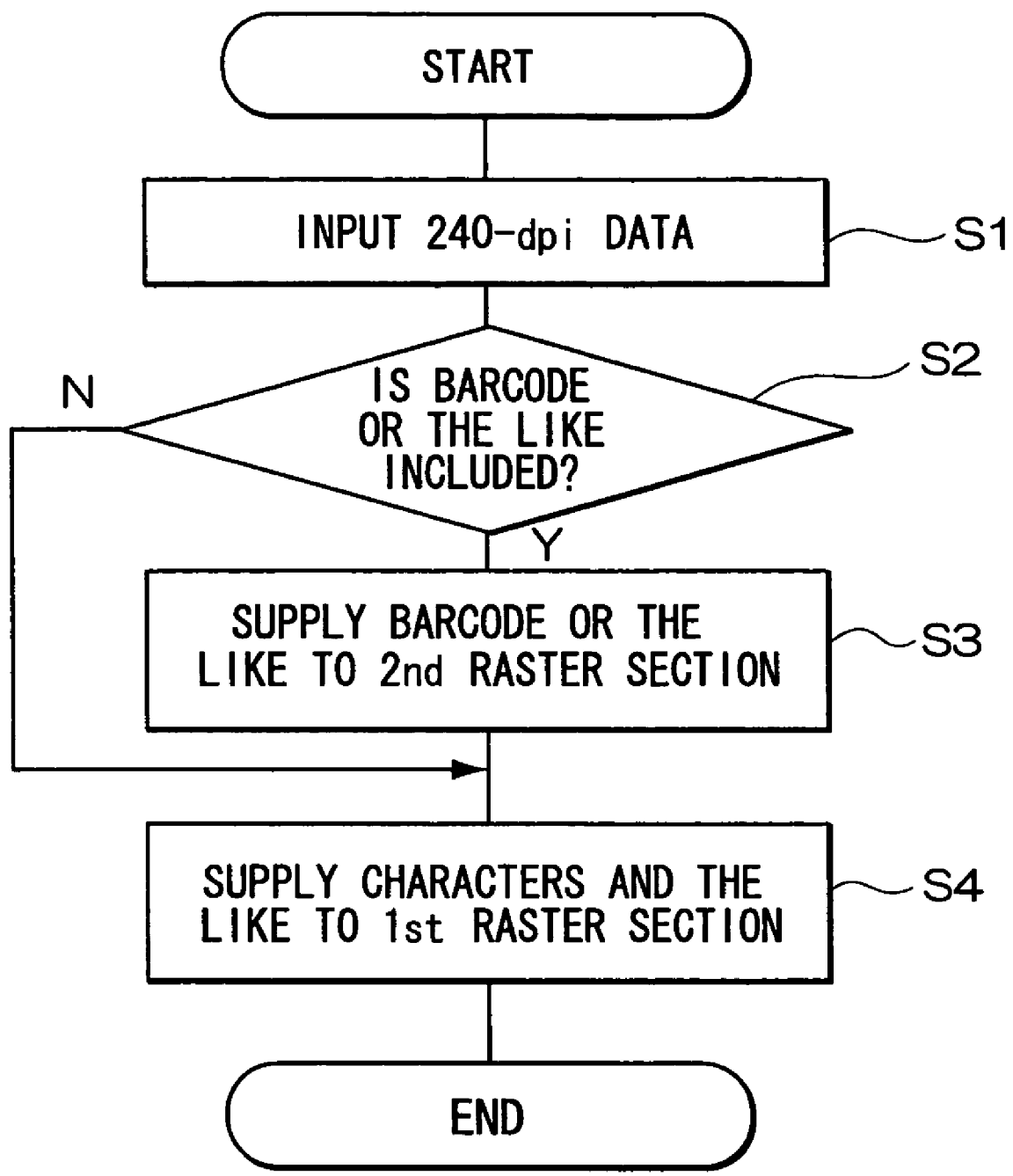
FIG. 2 is a flowchart illustrating the analysis processing for print data.

The data analysis section 21 of the printing apparatus 20 inputs print data of 240 dpi as shown in FIG. 2 (at step S1), and analyzes the components of the print data. Examples of the components include a character, a figure, an image, an overlay, a barcode, an OCR font.

The data analysis section 21 determines whether the components of the print data include a component (such as a barcode or an OCR font) which is optically read (as a piece of optical information) by a barcode reader, a scanner, or the like, after the printing (at step S2). Then, when a print data component of a barcode or an OCR font is given, the data analysis section 21 supplies it to the second raster section 26 (at step S3), then proceeding to the next step S4, and also when no barcode or OCR font component is given, the data analysis section 21 proceeds to the next step S4. Next, the data analysis section 21 supplies the character, the figure, the image, and the overlay, which are the other components of the print data, to the first raster section 22 (at step S4).

The first raster section 22 performs raster processing at 240 dpi for the components of the print data supplied from the data analysis section 21 to generate bitmap data, and stores this bitmap data in the bitmap memory 23.

The resolution conversion section 24 reads out the bitmap data from the bitmap memory 23 for performing the process of resolution conversion from 240 dpi to 600 dpi, and stores the resolution converted bitmap data in the bitmap memory 25.

On the other hand, the second raster section 26 performs raster processing at 600 dpi for the components of the print data supplied from the data analysis section 21 to generate bitmap data, and stores this bitmap data in the bitmap memory 27. In this way, the second raster section 26 performs raster processing at a high resolution of 600 dpi for the print data of the optically read printing portion.

The synthesizer 28 reads out the bitmap data of 600 dpi from the bitmap memories 25 and 27, respectively, for synthesizing (OR outputting) the bitmap data read out. Then, the printing section 29 carries out printing on the basis of the bitmap data synthesized by the synthesizer 28. Thereby, the barcode and the OCR font are printed with high definition.

In the first embodiment, the data analysis section 21 supplies the barcode and the OCR font of the components of the print data to the second raster section 26. However, in a case where, as a print data component, a convenience store charge collection service barcode is included, this convenience store charge collection service barcode may be supplied to the second raster section 26.

In addition, in the first embodiment, the barcode and the OCR font have been described as being required to be subjected to raster processing at a resolution of 600 dpi; however, even if, for example, there is no need for raster processing at a resolution of 600 dpi, the barcode and the OCR font may be rasterized by the second raster section 26.

Second Embodiment

Next, a second embodiment of the present invention will be described. The same component parts as those in the first embodiment are provided with the same numerals, and duplicated description is omitted.

Figure 3:
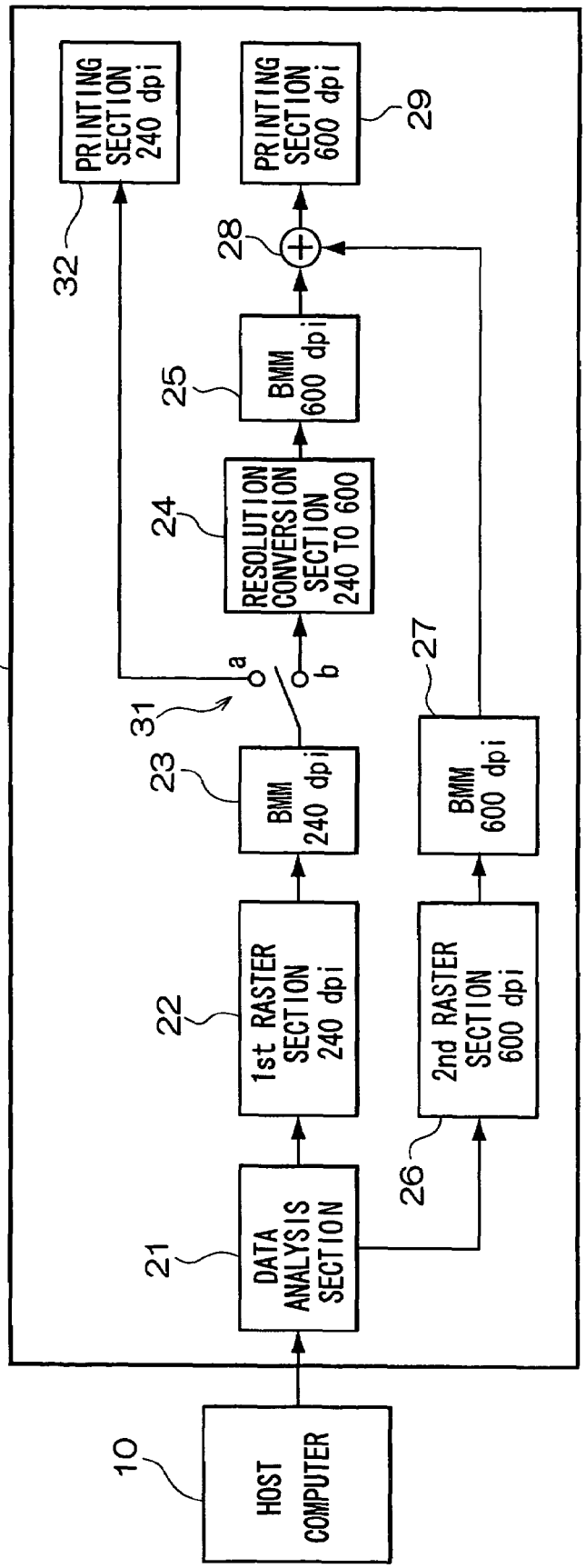
FIG. 3 is a block diagram illustrating the configuration of a printing system pertaining to a second embodiment of the present invention.

FIG. 3 is a block diagram illustrating the configuration of a printing system pertaining to a second embodiment of the present invention. The printing system pertaining to the second embodiment comprises a host computer 10 which outputs print data, and a printing apparatus 20A which carries out printing on the basis of the print data from the host computer 10. The printing apparatus 20A comprises a selector switch 31 and a printing section 32 which carries out printing at 240 dpi, in addition to the configuration shown in FIG. 1.

The selector switch 31 is set at a terminal "a" or a terminal "b" according to the analysis result of the data analysis section 21. When the selector switch 31 is set at the terminal "a", it supplies the bitmap data stored in the bitmap memory 23 to the printing section 32, and when the selector switch 31 is set at the terminal "b", it supplies the bitmap data stored in the bitmap memory 23 to the resolution conversion section 24.

The printing section 32 carries out printing at a resolution of 240 dpi on the basis of the bitmap data supplied from the selector switch 31. In other words, the printing apparatus 20A comprises the printing section 29 which carries out printing at a resolution of 600 dpi, and the printing section 32 which carries out printing at a resolution of 240 dpi, thus it converts the resolution for carrying out the printing.

In the printing system configured as above, the host computer 10 transmits print data of 240 dpi. The components of the print data may include a convenience store charge collection service barcode besides those described in the first embodiment. When the printing apparatus 20A receives print data of 240 dpi from the host computer 10, it implements the subsequent processing.

Figure 4:
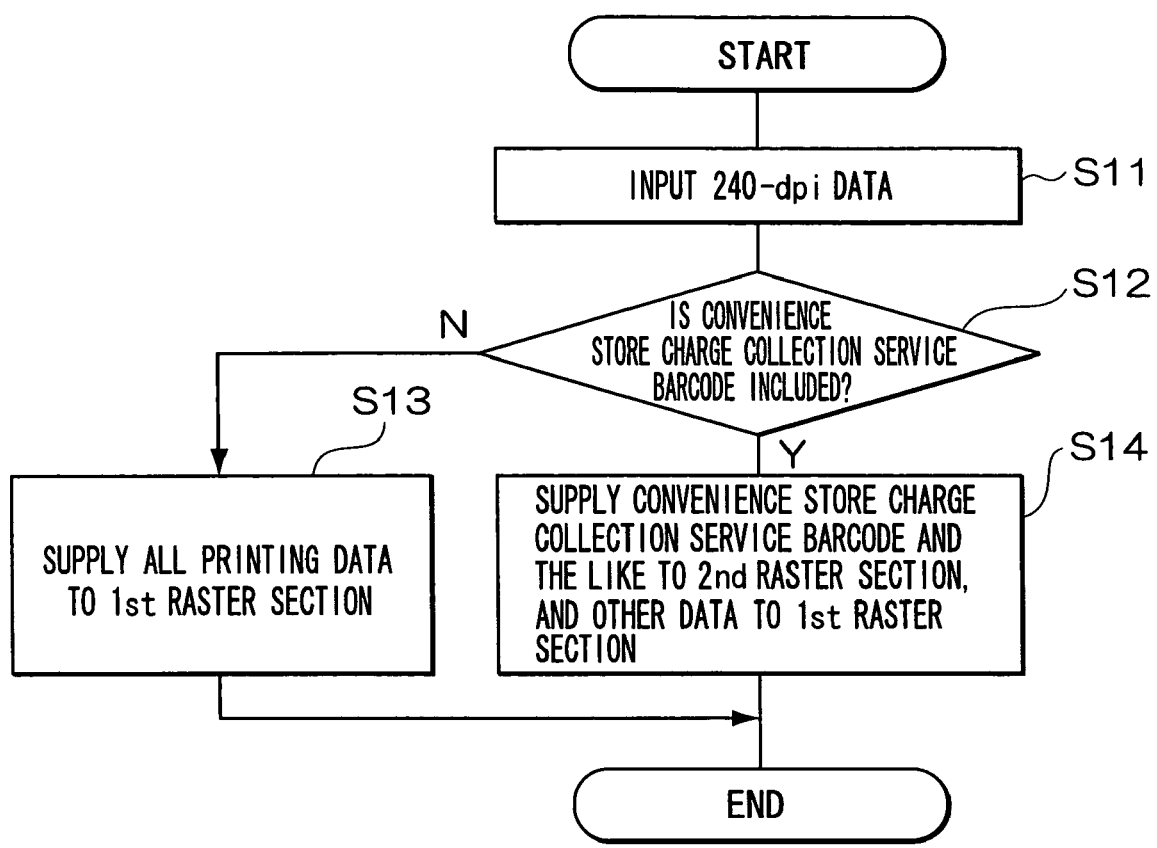
FIG. 4 is a flowchart illustrating the analysis processing for print data.

As shown in FIG. 4, the data analysis section 21 of the printing apparatus 20A inputs print data of 240 dpi (at step S11); analyzes the components of the print data; and determines whether the components of the print data include a convenience store charge collection service barcode (at step S12).

(A case when no convenience store charge collection service barcode is included in print data)

When the components of the print data include no convenience store charge collection service barcode, the data analysis section 21 supplies all the inputted print data to the first raster section 22 (at step S13). At this time, the selector switch 31 is set at the terminal "a".

The first raster section 22 performs raster processing at 240 dpi for all the print data supplied from the data analysis section 21 to generate bitmap data, and stores this bitmap data in the bitmap memory 23. The bitmap data stored in the bitmap memory 23 is supplied to the printing section 32 through the selector switch 31. The printing section 32 carries out printing at a resolution of 240 dpi on the basis of the bitmap data read out from the bitmap memory 23 through the selector switch 31.

Therefore, when no convenience store charge collection service barcode is included in the print data supplied from the host computer 10, the printing apparatus 20A carries out printing at a low resolution of 240 dpi.

(In case where convenience store charge collection service barcode is included in print data)

When the components of the print data include a convenience store charge collection service barcode (when an affirmative determination is given at step S12 as shown in FIG. 4), the data analysis section 21 supplies from the components of the print data components to be optically read by a scanner, or the like, at the time of printing (such as a convenience store charge collection service barcode, an ordinary barcode, or an OCR font) to the second raster section 26, and supplies the other components (such as a character, a figure, an image, or an overlay) to the first raster section 22 (at step S14). At this time, the selector switch 31 is set at the terminal "b".

The first raster section 22 performs raster processing at 240 dpi for the components of the print data supplied from the data analysis section 21 to generate bitmap data, and stores this bitmap data in the bitmap memory 23.

The resolution conversion section 24 reads out the bitmap data from the bitmap memory 23 through the selector switch 31 for performing the process of resolution conversion from 240 dpi to 600 dpi, and stores the resolution converted bitmap data in the bitmap memory 25.

On the other hand, the second raster section 26 performs raster processing at 600 dpi for the components of the print data supplied from the data analysis section 21 to generate bitmap data, and stores this bitmap data in the bitmap memory 27.

The synthesizer 28 reads out the bitmap data of 600 dpi from the bitmap memories 25 and 27, respectively, for synthesizing the bitmap data read out. Then, the printing section 29 carries out printing on the basis of the bitmap data synthesized by the synthesizer 28. Thereby, the convenience store charge collection service barcode, the barcode and the OCR font are printed with high definition.

As described above, the printing apparatus 20A carries out printing at a low resolution of 240 dpi for the print data of low resolution that includes no convenience store charge collection service barcode. In addition, for the print data of low resolution that includes a convenience store charge collection service barcode, the printing apparatus 20A performs raster processing of the convenience store charge collection service barcode, and the like, at a high resolution of 600 dpi, and for the print data other than the convenience store charge collection service barcode, and the like, the printing apparatus 20A performs raster processing at a low resolution of 240 dpi before performing the resolution conversion, and these are then synthesized for printing. The printing apparatus 20A may perform raster processing of only the convenience store charge collection service barcode from the components of the print data at a resolution of 600 dpi, and the other components at a resolution of 240 dpi.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing processing apparatus, comprising:
    an analyzing unit that analyzes components of print data of a first resolution, which is received from a host computer;
    a first raster processing unit that performs raster processing at the first resolution for the print data if a high resolution barcode is not present within the print data, and that performs raster processing at the first resolution for print data of a portion of the components of the print data other than a first optically read print portion if the high resolution barcode is present within the print data;
    a selector switch that outputs the print data to a first printing unit if a high resolution barcode is not present within the print data or outputs the print data to a second printing unit, of which resolution is higher than the first printing unit, if the high resolution barcode is present within the print data;
    a resolution conversion unit that converts the print data that has been processed by the first raster processing unit into the second resolution if the high resolution barcode is present within the print data, the second resolution being higher than the first resolution;
    a second raster processing unit that performs raster processing at the second resolution for print data of the first optically read printing portion of the components of the print data if the high resolution barcode is present within the print data; and
    a synthesizing unit that synthesizes the print data that has been converted into the second resolution by the resolution conversion unit and the print data that has been processed by the second raster processing unit if the high resolution barcode is present within the print data.

2. The printing processing apparatus of claim 1, wherein the second printing unit performs printing at the second resolution based on the print data that has been synthesized by the synthesizing unit.

3. The printing processing apparatus of claim 1, wherein the first optically read printing portion is at least one of a barcode and an OCR font.

4. The printing processing apparatus of claim 3, wherein the barcode is a charge collection service barcode.

5. The printing processing apparatus of claim 1, wherein
    the first raster processing unit performs raster processing for print data of a portion other than the high resolution barcode of the print data if the high resolution barcode is present within the print data; and
    the second raster processing unit performs raster processing for print data of the high resolution barcode if the high resolution barcode is present within the print data.

6. A printing processing method, comprising:
    analyzing components of print data of a first resolution which is received from a host computer;
    performing raster processing at the first resolution for print data if a high resolution barcode is not present within the print data, and performing raster processing at the first resolution for print data of a portion of the components of the print data other than a first optically read print portion if the high resolution barcode is present;
    outputting the print data to a first printing unit if a high resolution barcode is not present within the print data or outputting the print data to a second printing unit, of which resolution is higher than the first printing unit, if the high resolution barcode is present within the print data;
    converting the print data that has been subjected to raster processing at the first resolution into a second resolution if the high resolution barcode is present within the print data, the second resolution being higher than the first resolution;
    performing raster processing at the second resolution for print data of the first optically read printing portion of the components of the print data if the high resolution barcode is present within the print data; and
    synthesizing the print data that has been converted into the second resolution and the print data that has been subjected to raster processing at the second resolution if the high resolution barcode is present within the print data.

7. The printing processing method of claim 6, further comprising performing printing at the second resolution based on the print data that has been synthesized.

8. The printing processing method of claim 6, wherein the first optically read printing portion is at least one of a barcode and an OCR font.

9. The printing processing method of claim 8, wherein the barcode is a charge collection service barcode.

10. The printing processing method of claim 6,
    wherein the printing processing method further includes:
    performing raster processing for print data of a portion other than the high resolution barcode of the print data if the high resolution barcode is present within the print data; and
    performing raster processing for print data of the high resolution barcode if the high resolution barcode is present within the print data.

11. A printing system, comprising:
    a printing processing apparatus, comprising an analyzing unit that analyzes components of print data of a first resolution which is received from a host computer; a first raster processing unit that performs raster processing at the first resolution for the print data if a high resolution barcode is not present within the print data, and that performs raster processing at the first resolution for print data of a portion of the components of the print data other than a first optically read printing portion if the high resolution barcode is present within the print data; a selector switch that outputs the print data to a first printing unit if a high resolution barcode is not present within the print data or outputs the print data to a second printing unit, of which resolution is higher than the first printing unit, if the high resolution barcode is present within the print data;
    a resolution conversion unit that converts the print data that has been processed by the first raster processing unit into the second resolution if the high resolution barcode is present within the print data, the second resolution being higher than the first resolution; a second raster processing unit that performs raster processing at the second resolution for print data of the first optically read printing portion of the components of the print data if the high resolution barcode is present within the print data; and a synthesizing unit that synthesizes the print data that has been converted into the second resolution by the resolution conversion unit and the print data that has been processed by the second raster processing unit if the high resolution barcode is present within the print data; and the host computer that transmits the print data to the printing processing apparatus.

12. The printing system of claim 11, wherein the printing processing apparatus performs printing at the second resolution based on the print data synthesized by the synthesizing unit.

13. The printing system of claim 11, wherein the first optically read printing portion is at least one of a barcode and an OCR font.

14. The printing system of claim 13, wherein the barcode is a charge collection service barcode.

15. The printing system of claim 11, wherein the first raster processing unit performs raster processing for print data of a portion other than the high resolution barcode of the print data if the high resolution barcode is present within the print data; and the second raster processing unit performs raster processing for print data of the high resolution barcode if the high resolution barcode is present within the print data.

16. A non-transitory computer readable medium storing a program that causes a computer to execute a process for print processing, the process comprising:
   analyzing components of print data of a first resolution which is received from a host computer;
   performing raster processing at a first resolution for print data if a high resolution barcode is not present within the print data, and performing raster processing at the first resolution for print data of a portion of the components of the print data other than a first optically read print portion if the high resolution barcode is present;
   outputting the print data to a first printing unit if a high resolution barcode is not present within the print data or outputting the print data to a second printing unit, of which resolution is higher than the first printing unit, if the high resolution barcode is present within the print data;
   converting the print data that has been subjected to raster processing at the first resolution into a second resolution if the high resolution barcode is present within the print data, the second resolution being high than the first resolution;
   performing raster processing at the second resolution for print data of the first optically read printing portion of the components of the print data if the high resolution barcode is present within the print data; and
   synthesizing the print data that has been converted into the second resolution and the print data that has been subjected to raster processing at the second resolution if the high resolution barcode is present within the print data.

17. The computer readable medium of claim 16, wherein the process further comprises performing printing at the second resolution based on the print data that has been synthesized.

18. The computer readable medium of claim 16, wherein the first optically read printing portion is at least one of a barcode and an OCR font.

19. The computer readable medium of claim 18, wherein the barcode is a charge collection service barcode.

20. The computer readable medium of claim 16, wherein the process further includes:
   performing raster processing for print data of a portion other than the high resolution barcode of print data if the high resolution barcode is present within the print data; and
   performing raster processing for print data of the high resolution barcode if the high resolution barcode is present within the print data.

* * * * *